United States Patent Office 2,856,381
Patented Oct. 14, 1958

2,856,381

FOUNDRY SAND BINDER COMPOSITION CONTAINING AT LEAST THREE PHENOL-FORMALDEHYDE RESINS

Thomas J. McNaughtan, Elkins Park, and Howard E. Hoyt, Huntingdon Valley, Pa., assignors to The Borden Company, a corporation of New Jersey No Drawing. Application June 1, 1955
Serial No. 512,578

3 Claims. (Cl. 260—43)

This invention relates to a resin binder composition for sand in shell molds.

Shell molding (including cores) is in extensive use in so forming automobile parts as to require a minimum of subsequent machining. Metal patterns of approximately the dimensions of the metal parts to be molded are heated, as to 400° C. or so. Sand mixed with the binder is dropped over the heated pattern. That portion of the sand and binder adjacent to the heated pattern becomes adhered thereto. Loose, non-adhered sand is caused to fall away. The adhered sand and resin form a thin shell over the pattern. This shell is transferred to an oven at about 700° C. or so for curing for about 15 sec. during which time the resin is cured. The shells, ordinarily formed in halves, are cooled, removed from the pattern, and clamped together for subsequent filling with metal to be cast into the desired molded part.

There has been difficulty heretofore in obtaining all of the properties required in the binder for the finished shells. Thus there has been peeling (delamination) of the resin binder, for example, before the shell and enclosed pattern are heated to cause curing. The finished shells have shown lack of rigidity resulting in warping of the thin shells. There has been lack of strength of the cured shells resulting in an objectionably large proportion of ruptures during use of the shells.

This invention provides a resin binder composition that avoids these difficulties.

Briefly stated, the invention comprises a resin binder composition including, in intimately mixed powdered form, a mixture of at least two different phenol formaldehyde condensation products (resins) that are (1) fusible at the temperature of the sand and binder composition adjacent to the pattern, (2) thermosetting at higher temperatures, (3) characterized by different viscosities in the molten state, and (4) characterized also by different curing rates that are in inverse order to the viscosities. As a result, the condensation product of lowest viscosity and highest curing rate penetrates between the grains of the shell molding sand, undergoes curing, and thus skeletonizes the structure in advance of penetration and curing of other more viscous and less rapidly curing condensation product present.

By use of a binder composition blended of such diverse condensation products in shell molding, we have made sand shell molds of no lamination (peel back) during making, adequate rigidity, and strength of finished mold 142% of that obtained with a single resin binder of the same viscosity as the blended.

The viscosity is expressed herein as the time, in seconds, required for 1 gram of the resin (condensation product) to flow 40 mm. on a specially constructed metal plate inclined at an angle of 10° from the horizontal and maintained at 175° C.

Rigidity tests measure the deflection of a standard bar of the shell molding sand bonded with the resin binder.

A blend of resins, of viscosities 400, 40, and 6 sec., respectively, and of viscosity 112 for the blend, when used in the proportion of 4.25 parts of the mixed resins with 0.715 part of hexamethylenetetramine for 95 parts of shell molding sand, showed a deflection of 0.006". A single resin of about the same viscosity as the mixture of the three condensation products, that is, 110 sec., used and tested in the same manner, showed a deflection of 0.03".

For making shells for heavy castings, we use a more viscous mixture of the phenol formaldehyde condensation products.

In general, the resin binder mixture will contain at least two phenol formaldehyde condensation products, one product having a viscosity below 100 sec. and curing time less than 25 sec., when heated with 15% of hexamethylenetetramine at 154° C., and another condensation product having a viscosity above 300 sec. and a curing time above 60 sec. We obtain particularly good results when the mixture contains three resins of viscosities within the ranges 2–15, 20–70, and 200–700 sec. and curing times of 5–20, 25–40, and 60–90, respectively. It will be noted that here and in all examples one of the resins (condensation products) used has a viscosity at least about 10 times that of one of the other resins used.

As to materials, we use as the phenol one of the following: refined phenol, crude phenol such as the so-called "82% phenol" containing about 18% of cresol, cresol, cresylic acid, or xylenol.

The aldehyde used is formaldehyde, no advantage for the present purpose being found in the use of acetaldehyde, benzaldehyde, or furfural to offset their higher price.

As the donor of formaldehyde, which is mixed with the other materials in the resin binder compositions to cause hardening or setting at curing temperatures, we use hexamethylenetetramine to advantage. It lends itself to being milled with the previously reacted but uncured phenol aldehyde condensation product. Other conventional curing agents may be used as, for example, trishydroxymethyl nitromethane.

As to proportions, we use the formaldehyde in the proportion of about 0.7–1 mole for 1 of the phenol, the proportion being higher within this range as the viscosity of the condensation product to be made increases. The proportions are varied also in accordance with the curing rate desired in the finished resin, all in known manner.

Operating conditions include condensing the phenol and formaldehyde to fusible material in usual technique. Catalysts used are conventional and are selected in accordance with known practice for varying the viscosity and curing rates of the finished products.

In general, the individual resins may be made in any convenient manner, so long as they have the stated viscosities and rates of cure, in reverse order.

Water may be removed, as formed, by the technique and with the equipment shown in U. S. Patent 1,793,715 issued to Novotny.

The several diverse resins made as described in more detail later herein are mixed with the hexamethylenetetramine as the formaldehyde donor and milled cold to fine pulverulent condition of particle size to pass substantially completely through a 200 mesh screen. The mixture is then ready for use as the binder composition in shell molding.

The invention will be further illustrated by description in connection with the following examples of the practice of it. Proportions here and elsewhere herein are expressed as parts by weight unless specifically stated to the contrary.

EXAMPLE 1

Three different resins are made and blended so as to provide in the binder composition the properties required for shell molds.

Resin No. 1

100 parts of phenol and 0.2 part of sulfuric acid were heated to 100° C. Then 65 parts of formalin (37.5% actual formaldehyde) were added. The whole was refluxed until the formaldehyde was practically completely reacted. The product was dehydrated by evaporation to water content not more than 1.5%.

The resin so made has a time of cure, with 15% hexamethylenetetramine added and the temperature maintained at 154° C., of 35 sec. The viscosity by the inclined plane method described is 35.

Resin No. 2

This resin was made similarly except that the reactants were 100 parts of 82% technical phenol, 2 of oxalic acid, and 73.5 of 37.5% formalin and the batch was refluxed until the content of free formaldehyde fell below 2%. Time of cure under conditions comparable to those for the resin No. 1 is about 75 sec., viscosity 400.

Resin No. 3

100 parts of 82% phenol were mixed with a slurry of calcium hydroxide 0.2 part in 1 water. The mix was heated to 165° C. 65 parts of the formalin solution were then introduced over a period of 5 hours and the whole heated during that period to a resin of drop point 226° C. The curing time under conditions comparable to those for the resin No. 1 is approximately 12 sec. and viscosity 10.

MIXED BINDER COMPOSITION

Resins 1, 2, and 3 were then blended in the proportions of 55, 35, and 10 parts, respectively. The time of cure of the mix was about 32 sec., the viscosity 112.

The blend was then introduced and mixed in the amount of 4.25 parts of the mixed binder, 0.75 part of hexamethylenetetramine, and 95 parts of the shell molding sand. Also the several resins were tested separately in the same proportion, 4.25 parts, to 100 of sand and with the same proportion of 0.75 part of the formaldehyde donor to act as hardening agent. The results of the use of the several compositions in shell mold formation are given in the following table:

| Resin Number | 1 | 2 | 3 | Mixture of 1, 2, and 3 |
|---|---|---|---|---|
| Viscosity of resin | 35 | 400 | 10 | 112 |
| Time of cure, sec | 35 | 75 | 12 | 32 |
| Shells peel back | yes | no | yes | no |
| Transverse strength, p. s. i. | 22.7 | 13.5 | (*) | 22.8 |

* Not tested.

The mixed three component binder (last column) was the only one that showed no lamination (peel back) of the shell molds during their manufacture and also gave high transverse strength of the molds. The mixture was satisfactory also in general working characteristics in making the sand molding shells.

A single resin of viscosity 110 showed a transverse strength of only 16.

EXAMPLE 2

The procedure of Example 1 is followed except that the resin No. 3 in the table is omitted. Resins 1 and 2 (35 sec. and 400 sec.) are blended in amounts to give a blend of viscosity 100. This blend is then used in the amount of 4.25 parts for 0.75 part of hexamethylenetetramine and 95 parts of the sand. There was no peel back and the transverse strength of the mold was 21.6 p. s. i.

It will be understood that it is intended to cover all changes and modifications of the examples of the invention herein chosen for the purpose of illustration which do not constitute departures from the spirit and scope of the invention.

What we claim is:

1. A binder composition for sand in shell molds for metal casting, the binder composition comprising a solid pulverized mixture of at least three resins that are condensation products of 0.7–1 mole of formaldehyde and 1 of phenol with hexamethylenetetramine as curing agent, the said resins being fusible and thermosetting in contact with the curing agent, the three resins separately having viscosities, as measured by the flow time required for 1 gram of the condensation product to flow 40 mm. on a metal plate inclined at an angle of 10° from the horizontal and maintained at 175° C., of 2–15 seconds, 20–70 seconds, and 200–700 seconds, respectively, and the rates of thermosetting of the resins being in the inverse order of their viscosities.

2. The binder composition of claim 1 in which the times required for thermosetting of the several resins in contact with 15% of their weight of hexamethylenetetramine at 154° C. are 5–20 seconds, 25–40 seconds, and 60–90 seconds, respectively.

3. The binder composition of claim 1 in which the three resins are mixed in proportions to make the viscosity for the mixed resins approximately 100 seconds.

References Cited in the file of this patent

UNITED STATES PATENTS

| 2,706,188 | Fitko et al. | Apr. 12, 1955 |
| 2,729,553 | Price | Jan. 3, 1956 |

FOREIGN PATENTS

| 391,784 | Great Britain | May 2, 1933 |

OTHER REFERENCES

Bakelite Phenolic Resins, published by Union Carbide and Carbon Corp., 15 pages, page 15 particularly relied on.